United States Patent [19]
Kotwicki

[11] 4,424,783
[45] Jan. 10, 1984

[54] COMBUSTION CHAMBER INLET TEMPERATURE CORRECTED COMBUSTION INITIATION TIMING

[75] Inventor: Allan J. Kotwicki, Sterling Heights, Mich.

[73] Assignee: General Motors Corporation, Detroit, Mich.

[21] Appl. No.: 479,569

[22] Filed: Mar. 28, 1983

Related U.S. Application Data

[63] Continuation-in-part of Ser. No. 321,489, Nov. 11, 1981, abandoned.

[51] Int. Cl.$^3$ .................................................. F02P 5/04
[52] U.S. Cl. .................................... 123/418; 123/421
[58] Field of Search ............... 123/415, 416, 418, 421, 123/425, 417

[56] References Cited

U.S. PATENT DOCUMENTS

| | | | |
|---|---|---|---|
| 3,543,738 | 12/1970 | Barker et al. | 123/418 |
| 4,104,998 | 8/1978 | Fenn | 123/415 |
| 4,112,891 | 9/1978 | Spaulding | 123/409 |
| 4,231,091 | 10/1980 | Motz | 123/417 X |

FOREIGN PATENT DOCUMENTS

| | | | |
|---|---|---|---|
| 3012809 | 10/1981 | Fed. Rep. of Germany | 123/421 |
| 52-25931 | 2/1977 | Japan | 123/421 |

*Primary Examiner*—Tony M. Argenbright
*Attorney, Agent, or Firm*—Robert M. Sigler

[57] ABSTRACT

A four stroke internal combustion engine includes a time averaging temperature sensor disposed in the inlet passage to a combustion chamber sufficiently close to the inlet valve that it is exposed to the residual exhaust gases temporarily expanding backward into the inlet passage upon the opening of the inlet valve and the intake air during the subsequent intake stroke for relative times roughly proportional to the volume proportion of the mixture in the combustion chamber at the beginning of the compression stroke. The resultant combustion chamber inlet temperature is thus a more accurate approximation of the mixture than the temperature of intake air alone. A linear speed advance combustion initiation curve of slope $s_1$ is calibrated for a normal warm mode of engine operation at a predetermined combustion chamber inlet temperature $T_1$ and a modified slope $s_2$ is determined during engine operation from measured combustion chamber inlet temperature $T_2$ and the stored values of $s_1$ and $T_1$. Slope $s_2$ is multiplied by crankshaft rotational speed (RPM) to give the actual speed advance for combustion initiation.

6 Claims, 4 Drawing Figures

COMBUSTION CHAMBER INLET TEMPERATURE CORRECTED COMBUSTION INITIATION TIMING

This application is a Continuation-In-Part of U.S. Ser. No. 321,489, filed Nov. 11, 1981, now abandoned, and assigned to the assignee of this application.

This invention relates to the timing of combustion initiation in the combustion chamber of a four stroke internal combustion engine, and particularly to such timing using the combustion chamber inlet temperature to compensate in a continuous manner for temperature induced variations in the ignition delay period. Its primary advantage is the promotion of good combustion during cold start, the warmup period, and cold weather engine operation. The method can be used for either spark ignition or diesel injection delay period compensation.

It is believed that ignition in the combustion chamber of an internal combustion engine begins when the molecules of the mixture to be ignited have achieved their activation energy Q. Given the gas temperature, kinetic theory can be used to describe that fraction of the gas which has achieved the activation energy, and hence the reaction rate once ignition occurs. The molar rate of reaction at the point of ignition should approximately follow an Arhennius relation with temperature at the point of ignition T. The molar reaction rate M is described by the following equation: $M = A \exp(-Q/RT)$; where Q is the activation energy, T is the gas temperature, R is the gas constant and A is the asymptotic reaction rate, which is a function of reaction order and component concentrations. The function exp is the exponential function of the number e to the indicated power, where e is the well known base of natural logarithms. Assuming that ignition delay is the time required to combust some constant quantity of charge u, then the delay period t from spark or injection initiation until the flame can be detected in cylinder pressure or flame photographs is $t = u / (A \exp(-Q/RT))$.

The ignition delay is thus a function of the gas temperature T at the point of ignition. Because compression in an internal combustion engine is nearly adiabatic, the gas temperature T varies almost linearly with inlet gas temperature at the start of the compression stroke. Since the latter temperature is much easier to measure during engine operation, it is thus desirable to use the letter "T" to represent combustion chamber inlet gas temperature and add a proportionality constant C to the equation. The equation thus becomes: $t = u / (A \exp(-Q/RCT))$. Therefore, the ignition delay is a predictable function of combustion chamber inlet temperature, at least in theory. The theory appears to be supported by a reduction of delay time data taken from page 49 of *The Internal Combustion Engine*, Volume 2, by Taylor & Taylor, published 1968 by MIT Press. This data shows a large reduction in ignition delay with increasing inlet temperature; or, conversely, the requirement for a large centrifugal spark or injection advance at low inlet temperatures.

The prior art, at least in spark ignition control, recognizes the effect of temperature to some extent. However, this prior art, when it corrects spark timing in response to temperature, generally uses engine coolant temperature, which is generally not equal to and does not show the same characteristics as combustion chamber inlet temperature. Some prior art attempts a correction by measuring induction air temperature at the air cleaner or throttle body; however this is not necessarily sufficiently accurate. THe possible addition of recirculated exhaust gases or other fluids of different temperature and the heating or cooling effects of the internal intake passage walls can contribute to inaccuracy. However, if the previous factors are taken into account there is the additional effect of residual exhaust gases within the cylinder. These will almost always be significantly warmer than the intake air from the throttle body or carburetor, so that the actual temperature of the combustion chamber mixture at the beginning of the compression stroke will not be accurately represented by standard intake air measuring techniques. At the same time it is not practical to measure the desired temperature within the combustion chamber, even if a sufficiently rugged sensor could be found, since the temperature of the gases changes greatly during the combustion portion of the operating cycle and the measured temperature would tend to be a time averaged temperature of some sort which did not necessarily reflect the temperature at the beginning of the compression stroke.

In addition, where an engine temperature correction is made to engine spark timing in the prior art, it is generally an additive correction. An example is seen in Hosaka et al. 4,142,490, FIG. 7, in which an engine temperature signal is added to an engine speed signal in a summing junction to generate a spark advance signal. However, a speed or centrifugal advance timing curve, at least for a simple linear case, is actually no more than a conversion between engine speed and crank angle for an expected ignition delay following combustion event initiation. This ignition delay corresponds, from the preceding analysis, to a single combustion chamber inlet temperature. In actual practice, the slope of the engine speed advance curve is calibrated for a normally running warm engine temperature. Thus, the temperature correction for a colder engine should be made to the slope of the engine speed advance curve rather than in the form of another additive crank angle as in the prior art if accuracy is to be preserved throughout the total engine speed range.

SUMMARY OF THE INVENTION

The object of this invention is, therefore, ignition initiation timing for an internal combustion engine which is compensated in response to the approximate temperature of the actual combustion chamber mixture at the beginning of the compression stroke.

It is a further object of this invention to provide such ignition initiation timing utilizing a number representing an optimum linear relationship between engine crankshaft rotational speed and ignition timing crankshaft angle wherein said number is variable in response to combustion chamber inlet temperature.

These and other objects are obtained in an ignition timing system and method for an internal combustion engine in which is stored a reference temperature number representing combustion chamber inlet temperature for a predetermined warm mode of engine operation and a reference speed advance timing number representing the optimum linear relationship between combustion initiation at timing in crankshaft angle and crankshaft rotational speed for the predetermined warm mode of engine operation. The apparatus and method further measures combustion chamber inlet temperature and crankshaft rotational speed, derives an actual speed advance number from the reference speed advance timing number, reference temperature number, measured combustion chamber inlet temperature and crankshaft rotation speed and generates a combustion initiating event at a crankshaft rotational position derived at least from the actual speed advance number.

The combustion chamber inlet temperature may be measured most accurately within the inlet passage adjacent the inlet valve for the combustion chamber. For a throttled engine, when the intake valve first opens after the exhaust stroke the residual exhaust gases in the combustion chamber are at a higher pressure than that of the inlet passage and thus tend to expand back a short distance into the inlet passage. Therefore, a temperature sensor may be placed sufficiently close to the inlet to be exposed to this temperature for a short time before the intake air begins to flow therepast. Since temperature sensors are generally comparatively slow in response, the sensor will tend to time average the measured temperature; and the resulting output signal, at least at the end of the intake stroke, will tend to approximate the temperature of the compression chamber mixture at the beginning of the compression stroke. This follows from the fact that the time averaged combustion chamber inlet temperature will have contributions from the temperatures of the incoming intake gases and residual exhaust gases in proportion to the time of exposure to each, which will be roughly similar to the volume proportions of said gases in the expanded cylinder: numerically approximately equal to the compression ratio of the combustion chamber.

Further details and advantages of this invention will be apparent from the accompanying drawings and following description of a preferred embodiment.

DESCRIPTION OF THE PREFERRED EMBODIMENT

Figure 1:
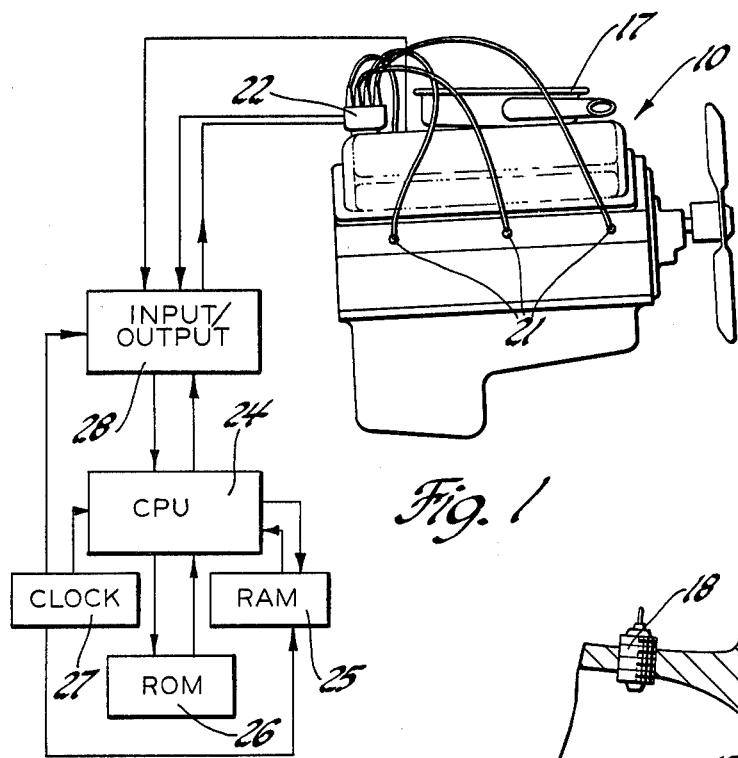
FIG. 1 is a schematic and block diagram of an internal combustion engine having a combustion initiation timing apparatus according to this invention.
Figure 2:
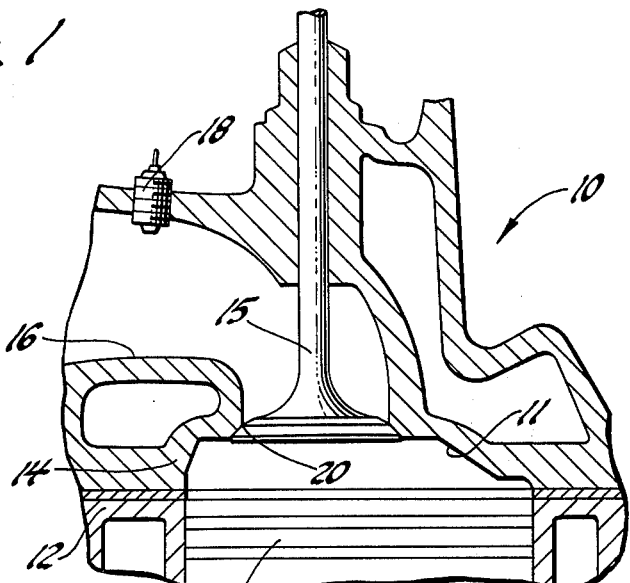
FIG. 2 is a partial cutaway view of a combustion chamber and inlet passage of the engine of FIG. 1.

The preferred embodiment will be described in the form of a spark ignited engine. Referring to FIG. 1, internal combustion engine 10 of the spark ignited variety has a plurality of combustion chambers, one of which is shown in FIG. 2. Combustion chamber 11 is formed by a cylinder in engine block 12, a piston 13 in the cylinder and a portion of cylinder head 14. Cylinder head 14 further defines an inlet passage 16 for combustion chamber 11 which is adapted to receive intake air supply apparatus, generally indicated at 17 in FIG. 1. This apparatus may comprise standard carburetor or throttle body apparatus as is well known in the art; and the apparatus may add fuel to the intake air at any point in the intake process, including direct injection into the cylinder. A combustion chamber inlet temperature sensor 18 is provided in passage 16. Sensor 18 is placed as close as possible to the inlet opening 20 of combustion chamber 11 so as to be sensitive to the residual exhaust gases expanding temporarily into the inlet passage at the opening of the inlet valve as well as the portion of the intake air which will enter combustion chamber 11 on the next opening of valve 15. Sensor 18 itself may be a standard thermistor or similar temperature sensor which has low pass or averaging characteristics.

When the piston 13 reaches top dead center at the end of the exhaust stroke and intake valve 15 opens the pressure of the residual exhaust gases in the clearance volume above piston 13 will be atmospheric or greater; but, assuming the engine is throttled, the pressure in the intake manifold will be below atmospheric. Thus, these gaes will immediately begin to expand back through opening 20 into inlet passage 16 and contact sensor 18 before being drawn back into the combustion chamber along with the intake air during the intake stroke. At the end of the intake stroke, the mixture within the combustion chamber will comprise intake air and residual exhaust gases in proportion roughly equal to the compression ratio of the combustion chamber. The effective temperature of this total mixture will approximate the volume-averaged temperatures of its constituents. However, the sensor has been exposed to the same constituents at their separate temperatures in roughly the same proportions and will time average these temperatures to produce approximately the same temperature signal output. Even with the various approximations, the resulting time averaged temperature will be closer to the actual mixture temperature than what could be achieved measuring intake air temperature alone.

In practice, it is believed that the residual exhaust gases will expand back into the inlet passage when the inlet valve opens at the end of each exhaust stroke by at least one clearance volume, where a clearance volume is the volume of the combustion chamber at top dead center. Thus, it is believed that one preferred embodiment of the invention would measure the temperature of the gases in the inlet passage within one clearance volume of the inlet with a time averaging temperature sensor to obtain the required combustion chamber inlet temperature. However, it may be found for a particular combustion chamber that the volume of the inlet passage exposed to residual exhaust gases is actually greater or less than one clearance volume, in which case the requirement is changed accordingly.

In addition, since the hotter residual exhaust gases make the first contribution to the combustion chamber inlet temperature, which contribution is followed by the longer lasting contribution of the cooler intake air, it will be seen that the time averaged temperature will tend to decrease throughout most of the intake stroke. It is therefore at least theoretically possible to "fine tune" the apparatus and method by picking the precise moment near the end (before or after) of the expansion stroke to fix the combustion chamber inlet temperature for calculation purposes.

Although not shown in FIG. 2, each of the combustion chambers of engine 10 is provided with a spark plug 21, as shown in FIG. 1, the activation of which defines the initiation of combustion in a combustion chamber such as combustion chamber 11. Activating electrical pulses are supplied to the various spark plugs 21 in a predetermined order by distributor 22 upon their generation in any manner known in the art in response to spark timing pulses. The spark timing pulses may be generated in a computer, in this embodiment, which comprises a central processing unit (CPU) 24, a random access memory (RAM) 25, a read only memory (ROM) 26, a clock 27 and an input/output apparatus 28. Input/output circuit 28 receives reference pulses from distributor 22 which occur in a predetermined angular relationship with top dead center of each combustion chamber 11 in engine 10. Input/output circuit 28 further receives speed information such as marker pulses from the teeth of an engine flywheel, not shown. If the flywheel marker pulses are used, they provide not only an indication of engine speed but also pulses which may be counted in an output counter in the generation of the actual spark timing pulses. Input/output apparatus 28 further receives the electrical signal from temperature sensor 18. Input/output apparatus 28 finally provides an output spark timing pulse for every input reference pulse delayed therefrom by a predetermined crankshaft angle in a manner to be described below. Input/output apparatus 28 thus includes the various analog-digital converters, registers, counters and other devices required to perform the preceding functions. Such apparatus is well known and commercially available as are the other computer components CPU 24, RAM 25, ROM 26 and clock 27. An example of such a computerized spark timing system is seen in the U.S. Pat. No. to Motz 4,231,091. Other computer and non-computer spark timing systems are also known in the art and could be modified according to this invention.

Figure 4:
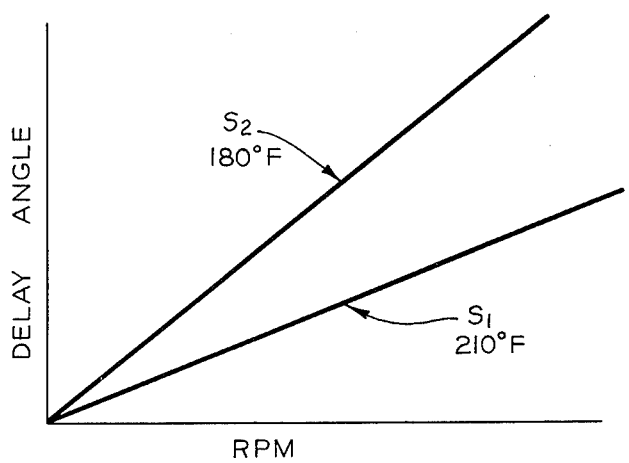
FIG. 4 is a graph showing speed advance curves for the engine of FIG. 1 at two different combustion chamber inlet temperatures.

Ignition delay in a spark ignited engine is presently compensated for by apparatus which calculates separate engine speed and engine load advance angles and adds them for a total ignition delay. The operation of the engine speed advance portion mechanism may be expressed as the linear curve of degrees of spark advance versus engine speed. The slope of this curve has the dimension of time in seconds; and it thus represents a certain ignition delay time which is an estimate of the combustion delay at a hot operating temperature of the engine. Thus, the engine speed advance curve works well for the engine when it is fully warmed up but is less appropriate when the engine is cold and a different slope is required. An example of this may be seen in FIG. 4, in which delay in crankshaft angle is plotted against engine speed in RPM. Line $S_1$ is a typical engine speed advance curve for a warmed up combustion chamber inlet temperature of, for example, 210° F. For a combustion chamber inlet temperature of 180° F., however, the curve $S_2$ is more appropriate since it provides a greater spark advance angle for an equivalent change in engine speed to compensate for the greater ignition delay at cold temperatures.

At two combustion chamber inlet temperatures $T_1$ and $T_2$, the following equations are true: $t_1 = u/(A \exp(-Q/RCT_1))$; $t_2 = u/(A \exp(-Q/RCT_2))$. These can be combined and simplified to the following equation: $t_2 = t_1 \exp(Q/RC) \cdot (1/T_2 - 1/T_1)$. This equation relates the two ignition delays $t_2$ and $t_1$ in an exponential function with a constant $(Q/RC)$ and the difference of the reciprocals of the combustion chamber inlet temperatures $T_1$ and $T_2$ corresponding to those ignition delays. Since the slopes $s_1$ and $s_2$ of speed advance curves $S_1$ and $S_2$ have units measured in time and correspond to the ignition delays $t_1$ and $t_2$, they may be substituted therefore. Thus: $s_2 = s_1 \exp(Q/RC) (1/T_2 - 1/T_1)$. In other words, if the slope $s_1$ of a speed advance curve is determined for an engine at a normal warm operating combustion inlet temperature $T_1$ and these numbers are stored in ROM 26 as reference speed advance timing numbers $s_1$ and a reference temperature number $T_1$, the slope $s_2$ for any other measured combustion chamber inlet temperature $T_2$ may be derived from the equation and multiplied by engine speed (RPM) for the combustion inlet temperature corrected or actual speed advance angle at temperature $T_2$.

With the preceding method and equation established, the operation of the apparatus of FIG. 1 may be described with reference to the flow chart of FIG. 3, which represents a program of operating instructions stored in ROM 26. These instructions are read and executed by CPU 24 in response to clock pulses from clock 27 in the normal manner of computers. The program herein described, of course, is ordinarily only a small part of an overall engine control program which may include many other inputs, outputs and functions not shown.

Figure 3:
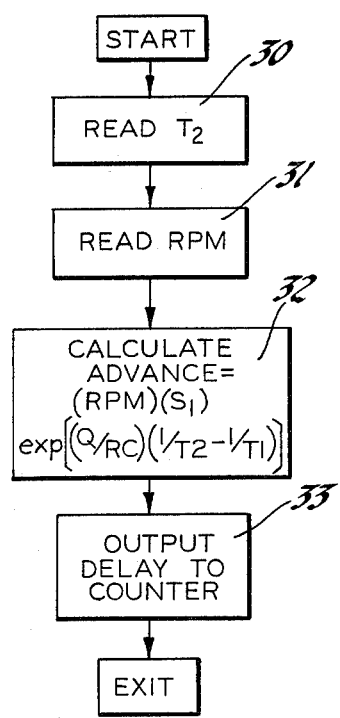
FIG. 3 is a flow diagram describing the operation of the combustion initiating event timing apparatus of FIG. 1.

Referring to FIG. 3, after the start of this program, the combustion chamber inlet temperature ($T_2$) and the engine crankshaft rotational speed (RPM) are read in steps 30 and 31, respectively. It is assumed that each of these numbers has already been generated and exists in a memory location in RAM 25. The temperature $T_2$ would have been converted from a continuous analog voltage signal from sensor 18 at a particular time within this or a previous computer cycle to a digital number in input/output apparatus 28, read by CPU 24 and stored in RAM 25. The number RPM would have been calcuated in a different part of the program from the times between input pulses from distributor 22 or flywheel teeth over many computer cycles and repeatedly updated and stored in RAM 25. The reading steps 30 and 31 may thus symbolize these previous processes or may represent the transfer of the numbers from their "permanently" assigned storage locations in RAM 25 to a scratchpad register or other temporary storage location in anticipation of immediate use.

In step 32, the actual speed advance number ADVANCE is calculated according to the equation derived above and shown in FIG. 3. In actual practice, the exponential function exp would probably be accomplished by means of a table lookup, possibly with interpolation. The details of the programming of the calculations and table lookup should be obvious to a skilled programmer.

When the actual speed advance number is calculated, it may be added to a load advance number, the calculation of which is not shown herein, and then output in step 33 to a counter in input/output apparatus 28. When the counter is triggered by a reference pulse from distributor 22, it counts marker pulses from the engine flywheel up to the number stored therein to initiate combustion at the predetermined crankshaft rotational angle.

The preceding preferred embodiment is only one of many within the scope of this invention which will occur to those skilled in the art. Therefore, the invention should be limited only by the claims which follow.

The embodiments of the invention in which an exclusive property or privilege is claimed are defined as follows:

1. Apparatus for initiating optimally timed combustion in the combustion chamber of a four stroke internal combustion engine having a rotating crankshaft, the combustion chamber having an inlet opening from an inlet passage, said combustion chamber further being adapted to receive intake air through said inlet and inlet passage during each intake stroke and being characterized by residual exhaust gases which tend to temporarily expand backward through said inlet into the inlet passage at the end of each exhaust stroke before being swept back into the combustion chamber by said intake air during the following intake stroke, the apparatus comprising, in combination:

means effective to measure the temperature of gases in the inlet passage adjacent the inlet so as to be exposed to said backwardly expanding residual exhaust gases as well as the incoming intake air, said temperature measuring means having a time averaging characteristic, such that the measured temperature at least at the end of the expansion stroke is affected by the temperatures of both said residual exhaust gases and said incoming intake air in proportion to the relative times of exposure to each and thus closely approximates the mixture in the combustion chamber at the beginning of the compression stroke; and means effective to initiate combustion events in said combustion chamber at a crankshaft rotational position based at least in part on the temperature as measured by said temperature measuring means, whereby the timing of said event is corrected for temperature related variations in reaction rate of the mixture within the combustion chamber.

2. Apparatus for initiating optimally timed combustion in the combustion chamber of a four stroke internal combustion engine having a rotating crankshaft, the combustion chamber having an inlet opening from an inlet passage, said combustion chamber further being adapted to receive intake air through said inlet and inlet passage during each intake stroke and being characterized by residual exhaust gases which tend to temporarily expand backward through said inlet into at least one clearance volume of said inlet passage at the end of each exhaust stroke before being swept back into said combustion chamber by the intake air during the intake stroke, the apparatus comprising, in combination:

means effective to measure the temperature of the gases in the inlet passage within said one clearance volume of the inlet, said temperature measuring means having a time averaging characteristic so that the measured temperature at least at the end of the intake stroke is affected by the temperatures of the intake air and residual exhaust gases in proportion to the relative times of exposure to each and thus approximates the temperature of the mixture within the combustion chamber at the beginning of the compression stroke more closely than would that measured by a similar sensor exposed only to the intake air; and means effective to initiate combustion events in said combustion chamber at a crankshaft rotational position based at least in part on the temperature as measured by said temperature measuring means, whereby the timing of said initiation is corrected for temperature related variations in reaction rate of the mixture within the combustion chamber.

3. A method for initiating optimally timed combustion in a combustion chamber of a four stroke internal combustion engine having a rotating crankshaft, the combustion chamber having an inlet adapted to receive an intake air from an inlet passage during an intake stroke and further allowing residual exhaust gases to temporarily expand backward into said inlet passage at the end of an exhaust stroke before being swept back into the combustion chamber by the intake air during the following intake stoke, the method comprising the following steps:

measuring, during at least the end of the exhaust stroke and substantially throughout the intake stroke, the temperature of gases within the inlet passage at a point sufficiently close to the inlet to be exposed to said backwardly expanding residual exhaust gases as well as said intake air;

time averaging said temperature as measured by said previous step to obtain a single combustion chamber inlet temperature to which the contributions of the actual measured temperatures of the residual exhaust gases and intake air are determined by the relative times during which each is measured; and initiating a combustible event in said combustion chamber at a crankshaft rotational position based at least in part on said combustion chamber inlet temperature, whereby the timing of said event is corrected for temperature related variations in reaction rate of the mixture in the combustion chamber.

4. A method for initiating optimally timed combustion in the combustion chamber of a four stroke internal combustion engine having a rotating crankshaft, the combustion chamber having an inlet opening to an inlet passage being adapted to receive intake air therethrough, the combustion chamber further being characterized by residual exhaust gases which expand backward into said inlet passage at the end of each exhaust stroke before being swept into said combustion chamber again by said intake air during the following intake stroke, the method comprising:

storing a reference temperature number ($T_1$) representing combustion chamber inlet temperature for a predetermined warm mode of engine operation, the combustion chamber inlet temperature being the temperature of gases in the inlet passage sufficiently close to the inlet to be exposed at different times to the intake air and the residual exhaust gases, said temperature being time averaged over at least the end of the exhaust stroke and substantially all the intake stroke;

storing a reference speed advance timing number ($S_1$) representing the optimum linear relationship between combustion initiation event timing, in crankshaft angle with reference to crankshaft rotational position, and crankshaft rotational speed for the predetermined warm mode of engine operation;

measuring combustion chamber inlet temperature ($T_2$) and crankshaft rotational speed (RPM);

deriving an actual speed advance number from the reference speed advance timing number, reference temperature number, measured combustion chamber inlet temperature and crankshaft rotational speed; and generating a combustion initiating event at a crankshaft rotational position derived at least from said actual speed advance number, whereby the timing of said event is corrected for temperature related variations in reaction rate of the mixture in the combustion chamber.

5. Apparatus for initiating optimally timed combustion in the combustion chamber of a four stroke internal combustion engine having a rotating crankshaft, the combustion chamber having an inlet opening to an inlet passage and being adapted to receive a combustible gas charge therethrough, the combustion chamber further being characterized by residual exhaust gases which expand backward into said inlet passage at the end of each exhaust stroke before being swept into said combustion chamber again by said intake air during the following intake stroke, the apparatus comprising, in combination:

first means effective to store a reference temperature number ($T_1$) representing combustion chamber inlet temperature for a predetermined warm mode of engine operation and a reference speed advance timing number ($S_1$) representing the optimum linear relationship between combustion initiation event timing, in crankshaft angle with reference to crankshaft rotational position, and crankshaft rotational speed for the predetermined warm mode of engine operation, the combustion chamber inlet temperature being the temperature of gases in the inlet passage sufficiently close to the inlet to be exposed at different times to the intake air and the residual exhaust gases, said temperature being time averaged over at least the end of the exhaust stroke and substantially all the intake stroke;

second means effective to measure combustion chamber inlet temperature ($T_2$) and crankshaft rotational speed (RPM);

third means effective to derive an actual speed advance number from the reference speed advance timing number, reference temperature number, measured combustion chamber inlet temperature and crankshaft rotational speed; and fourth means effective to generate a combustion initiating event at a crankshaft rotational position derived at least from said actual speed advance number, whereby the timing of said event is corrected for temperature related variations in reaction rate of the mixture in the combustion chamber.

6. Apparatus for initiating optimally timed combustion in the combustion chamber of a four stroke internal combustion engine having a rotating crankshaft, the combustion chamber having an inlet with an inlet passage leading thereto and being adapted to receive intake air therethrough, the combustion chamber further being characterized by residual exhaust gases which expand backward into said inlet passage at the end of each exhaust stroke before being swept into said combustion chamber again by said intake air during the following intake stroke, the apparatus comprising in combination:

first means effective to store a reference temperature number ($T_1$) representing combustion chamber inlet temperature for a predetermined warm mode of engine operation and a reference speed advance timing number ($S_1$) representing the optimum linear relationship between combustion initiation event timing, with reference to crankshaft rotational position, and crankshaft rotational speed for the predetermined warm mode of engine operation, the combustion chamber inlet temperature being the temperature of gases in the inlet passage sufficiently close to the inlet to be exposed at different times to the intake air and the residual exhaust gases, said temperature being time averaged over at least the end of the exhaust stroke and substantially all the intake stroke;

a temperature sensor disposed in the inlet passage within one clearance volume of the inlet to measure combustion chamber inlet temperature ($T_2$);

second means effective to measure crankshaft rotational speed (RPM);

third means effective to derive an actual speed advance number from the reference speed advance timing number, reference temperature number measured combustion chamber inlet temperature and crankshaft rotational speed; and fourth means effective to generate a combustion initiating event at a crankshaft rotational position derived at least from said actual speed advance number, whereby the timing of said event is corrected for temperature related variations in reaction rate of the mixture in the combustion chamber.

* * * * *